(12) United States Patent
Jorn et al.

(10) Patent No.: US 10,220,932 B2
(45) Date of Patent: Mar. 5, 2019

(54) PRESSUE BULKHEAD FOR AN AIRCRAFT FUSELAGE

(71) Applicant: Airbus Operations GmbH, Hamburg (DE)

(72) Inventors: Paul Jorn, Hamburg (DE); Karim Grase, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 390 days.

(21) Appl. No.: 15/217,474

(22) Filed: Jul. 22, 2016

(65) Prior Publication Data

US 2017/0021908 A1    Jan. 26, 2017

(30) Foreign Application Priority Data

Jul. 22, 2015    (DE) .......................... 10 2015 111 935

(51) Int. Cl.
*B64C 1/10*    (2006.01)
*B32B 7/08*    (2019.01)
(Continued)

(52) U.S. Cl.
CPC ................. *B64C 1/10* (2013.01); *B32B 1/00* (2013.01); *B32B 3/06* (2013.01); *B32B 3/263* (2013.01);
(Continued)

(58) Field of Classification Search
CPC ..................................... B64C 1/10; B32B 7/08
See application file for complete search history.

(56) References Cited

U.S. PATENT DOCUMENTS

| 5,899,412 A | 5/1999 | Dilorio et al. |
| 6,213,426 B1 * | 4/2001 | Weber ........................ B64C 1/10 |
| | | 244/117 R |

(Continued)

FOREIGN PATENT DOCUMENTS

| DE | 10 2007 044 388 | 4/2009 |
| DE | 10 2010 018 933 | 11/2011 |

(Continued)

OTHER PUBLICATIONS

European Search Report cited in EP 16 18 0704, completed Nov. 22, 2016, 6 pages.

(Continued)

*Primary Examiner* — Brian M O'Hara
(74) *Attorney, Agent, or Firm* — Nixon & Vanderhye P.C.

(57) ABSTRACT

A pressure bulkhead (1) for an aircraft fuselage (3) having a sandwich structure (5) which defines a central axis (9) and which extends between a circumferential edge area (7), wherein the sandwich structure (5) includes an inner cover layer (13), an outer cover layer (17), and a core layer (19), which extends between the inner and outer cover layers (13, 17) and connects them. The object of providing a pressure bulkhead (1) for an aircraft fuselage (3) which, even in the case of larger fuselage diameters, can particularly effectively absorb the occurring pressure forces and which can also be built with minimal weight, is achieved in that, between the inner and the outer cover layers (13, 17), in addition to the core layer (19), a support structure (23) is provided, which is connected to the cover layers (13, 17) and which extends from the inner cover layer (13) to the outer cover layer (17), and in that the support structure (23) comprises at least one layer (25) which, viewed in a cross section (21) parallel to the central axis (9), extends from a first section (7a) of the (Continued)

edge area (7) to an opposite second section (7b) of the edge area (7).

19 Claims, 1 Drawing Sheet

(51) Int. Cl.
| | |
|---|---|
| *B32B 1/00* | (2006.01) |
| *B32B 3/28* | (2006.01) |
| *B32B 5/18* | (2006.01) |
| *B64C 1/06* | (2006.01) |
| *B32B 5/02* | (2006.01) |
| *B32B 5/24* | (2006.01) |
| *B32B 3/06* | (2006.01) |
| *B32B 3/26* | (2006.01) |
| *B64C 1/00* | (2006.01) |

(52) U.S. Cl.
CPC .................. *B32B 3/28* (2013.01); *B32B 5/02* (2013.01); *B32B 5/18* (2013.01); *B32B 5/245* (2013.01); *B32B 7/08* (2013.01); *B64C 1/069* (2013.01); *B32B 2250/03* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2266/0242* (2013.01); *B32B 2307/558* (2013.01); *B32B 2307/56* (2013.01); *B32B 2605/18* (2013.01); *B32B 2607/00* (2013.01); *B64C 2001/0072* (2013.01)

(56) References Cited

U.S. PATENT DOCUMENTS

| | | | |
|---|---|---|---|
| 8,444,089 B2* | 5/2013 | Mischereit | B64C 1/10 |
| | | | 244/118.5 |
| 2001/0025903 A1 | 10/2001 | Weber et al. | |
| 2009/0242701 A1 | 10/2009 | Kondo | |
| 2012/0051937 A1 | 3/2012 | Grase et al. | |
| 2016/0340017 A1* | 11/2016 | Jorn | B64C 1/10 |

FOREIGN PATENT DOCUMENTS

| | | |
|---|---|---|
| DE | 10 2012 005 451 | 9/2013 |
| DE | 10 2013 114 391 | 6/2015 |

OTHER PUBLICATIONS

German Search Report cited in DE 10 2015 111 935.8 dated Jan. 29, 2016, seven pages.

* cited by examiner

PRESSUE BULKHEAD FOR AN AIRCRAFT FUSELAGE

RELATED APPLICATION

This application claims priority to German patent application 10 2015 111 935.8, filed Jul. 22, 2015, the entirety of which is incorporated by reference.

BACKGROUND AND SUMMARY OF INVENTION

The present invention relates to a pressure bulkhead for an aircraft fuselage, in particular a flat pressure bulkhead for a wide-body aircraft fuselage, as well as to an aircraft with an aircraft fuselage, in which such a pressure bulkhead is installed. The pressure bulkhead comprises a sandwich structure or is formed as a sandwich structure.

The sandwich structure extends between a circumferential edge area or region and defines a central axis with respect to this edge area. The central axis may be perpendicular to a plane between opposite sections of the edge area and may be parallel to the aircraft longitudinal axis of an aircraft fuselage when the pressure bulkhead is installed therein. The edge area is configured or adapted to be attached or secured to the fuselage structure of the aircraft fuselage and to maintain in this manner the pressure difference between the pressure side, i.e. the cabin, and the unpressurized rear section of the aircraft fuselage.

The sandwich structure comprises an inner cover or top layer facing towards the pressure side, an outer cover or top layer facing towards the rear and being disposed opposite the inner cover layer, and a core layer, which extends between the inner and the outer cover layers and connects them. The inner and outer cover layers extend transversely, such as perpendicularly, to the central axis and are may be made from fiber-reinforced composite material, in particular from Carbon-fiber-reinforced polymer (CFRP) or graphite fiber-reinforced polymer (GFRP), but may, however, also be made from a metallic material. The core layer may be made from foam material, such as polymethacrylimide (PMI), for example. The edge area can be formed either in a monolithic design, wherein the cover layers lie against one another and no core layer is provided, or formed in a sandwich design, wherein the core layer also extends through the edge area.

Several such pressure bulkheads or similar pressure bulkheads are known from the prior art. In the pressure bulkhead customarily used today, the skin element, together with the reinforcing elements attached thereto, has a dome-shaped pronounced curvature, in order to be able to absorb the pressure load between cabin pressure and ambient pressure acting on the pressure bulkhead as good as possible. The reinforcement elements are disposed in a radial manner on the convex surface of the skin element. However, the disadvantage with such a pressure bulkhead design is that, on the one hand, the pressure bulkhead takes up a lot of space due to the pronounced curvature, wherein the space inside the curvature is normally not utilized for safety reasons, and, on the other hand, the production of the pressure bulkhead as a fiber-reinforced workpiece is very costly and time-consuming, since disposing and attaching the reinforcement element on the curved skin element is a very complex undertaking.

For these reasons, the prior art includes various attempts to design non-curved pressure bulkheads, the skin elements of which thus extend substantially planar and which have no curvature or only a very slight curvature. Such pressure bulkheads are described in U.S. 2009/0242701 A1, U.S. 2001/0025903 A1 or DE 10 2010 018 933 A1, for example. Furthermore, similar flat pressure bulkheads are already known from smaller types of aircraft, such as the Fokker 100, for example.

At the same time, it has been found that it can be particularly advantageous to form or construct flat pressure bulkheads in a sandwich design with a lenticular or lens-shaped cross section because the pressure forces can be absorbed particularly effectively by such a structure, while a minimum weight of the pressure bulkhead is possible. Such a pressure bulkhead is described in DE 10 2012 005 451 A1, for example. In order to prevent the cover layers from detaching from the core layer and to prevent formation or expansion of cracks in the core layer in such a sandwich pressure bulkhead, it is known in the prior art to reinforce the sandwich structure by means of pins, which extend through the core layer from one cover layer to the other.

However, in the case of aircraft with a large fuselage diameter, so-called wide-body aircraft, such as the aircraft models A330, A340, A350 and A380 by Airbus, or similar types of aircraft, the problem arises that the large core thickness, and thus that of the sandwich structure, required to absorb the forces due to the large fuselage diameter can exceed the pin length which, due to the method for introducing the pins, is limited to approximately 90 mm, so that the pins would not extend from cover layer to cover layer and consequently could not be effectively used. The use of pressure bulk-heads in the form of lenticular sandwich structures is thus problematic in the case of wide-body aircraft and this design is rarely employed in practice.

SUMMARY OF INVENTION

The inventors conceived and disclose here a pressure bulkhead for an aircraft fuselage which, even in the case of larger fuselage diameters, can particularly effectively absorb the occurring pressure forces and which at the same time can be built with minimal weight.

The inventive pressure bulkhead may have, between the inner and the outer cover layers and in addition to a core layer, a monolithic support structure connected to the cover layers and which extends from the inner cover layer to the outer cover layer. The support structure has at least one layer which, viewed in a cross section parallel to the central axis, extends from a first section of the edge area to an opposite second section of the edge area. The layer should be understood such that its dimension in a thickness direction is significantly smaller than its dimensions in the two directions of extension perpendicular to the thickness direction. The layer can extend parallel to the central axis, but also transversely, in particular perpendicularly, to the central axis.

In this manner, the cover layers and the core layer can be supported and stabilized particularly effectively or efficiently by the support structure, so that a crack formation or crack propagation can be successfully controlled or counteracted there. This is particularly the case for sandwich structures having a large thickness, as are required in wide-body aircraft.

In an embodiment of the invention, the outer cover layer may have, viewed in a cross section parallel to the central axis, a convex, a continuous lenticular or lens-shaped profile or extension, at least in sections, from the first section of the edge area to the second section of the edge area. This means that the outer cover layer is curved towards the rear of an associated aircraft fuselage. The lenticular or lens-shaped profile may have the form of a catenary, a parabola or a segment of a circle. In this regard, the catenary can be defined as follows:

$$y = a \cdot \cosh\left(\frac{x - x_0}{a}\right) + y_0$$

wherein the x-axis extends in a radial direction perpendicular to the central axis, wherein the y-axis extends perpendicular to the x-axis and parallel to the central axis, wherein a representing an enlargement factor, wherein $x_0$ represents the distance of the vertex from the central axis, and wherein $y_0$ represents the displacement along the central axis. With such a profile or extension of the outer cover layer the occurring pressure loads can be absorbed and transferred particularly effectively.

Additionally or alternatively, in another embodiment, the inner cover layer has, viewed in a cross section parallel to the central axis, a convex, may be a continuous lenticular or lens-shaped profile or extension, at least in sections, from the first section of the edge area to the second section of the edge area. This means that the inner cover layer is curved towards the cabin of an associated aircraft fuselage. The lenticular or lens-shaped profile or extension may have the form of a catenary, a parabola or a segment of a circle. With such a profile or extension of the inner cover layer, the occurring pressure loads can be absorbed and transferred particularly effectively. Both the inner and the outer cover layers may have a convex, continuous and lenticular or lens-shaped profile or extension.

In an alternative embodiment, the inner cover layer has, viewed in a cross section parallel to the central axis, a straight profile, at least in sections, from the first section of the edge area to the second section of the edge area. In this manner, the planar surface of the inner cover layer of the pressure bulkhead facing towards the cabin of an associated aircraft fuselage can advantageously be used for connecting or attaching cabin elements.

In a further embodiment, the layer is formed as an anchor or bracing layer, which extends transversely, in particular perpendicularly, to the central axis. The anchor layer may extend along the entire edge area and is attached there between the cover layers or to one of the cover layers. The anchor layer may be formed in a monolithic manner with one or with both of the cover layers. The core layer is divided into an inner and an outer core layer section, which are separated or delimited from one another by the anchor or bracing layer. In addition, the support structure comprises a plurality of pins, which extend between the anchor layer and the outer cover layer and between the anchor layer and the inner cover layer, and which are attached with a first end to the anchor layer and with an opposite second end to the outer cover layer or to the inner cover layer. The pins may be cured together with the anchor layer and the inner and outer cover layer, respectively.

With the aid of such an anchor layer, it is possible to bridge a large thickness of the sandwich structure, i.e., a large distance between the cover layers, so that even pressure bulkheads for large fuselage diameters with a large sandwich structure thickness can be effectively reinforced by means of pins, and crack formations in the core layer and delamination of the cover layers can thus be prevented or halted. In particular, the pins, which have a length limited to approximately 90 mm for reasons of the introduction process, and in particular for reasons of the stability and friction of the needles used for the introduction of the pins, can also be used in the case of sandwich structures, the cover layers of which are, due to the large core thickness required, spaced significantly more than approximately 90 mm apart from one another, because the pins are attached via their first end to the anchor layer and via their second end to the inner and outer cover layer, respectively, so that the anchor layer connects those pins that are secured in the inner cover layer with those pins that are secured in the outer cover layer. In this way, core thicknesses of approximately 180 mm can be bridged. Even larger core thicknesses can be bridged by using additional anchor or bracing layers.

In this regard, the anchor layer may be a first anchor or bracing layer and if one or more additional anchor or bracing layers are provided, which extend transversely to the central axis. The additional anchor layers may extend, at least in sections, in the region of the central axis, parallel to the first anchor layer and may be perpendicularly to the central axis. The pins in this case extend between the different anchor layers and between one of the anchor layers and one of the cover layers, and are attached with their first end to one of the anchor layers and with their second end to another anchor layer, to the inner cover layer, or to the outer cover layer. In this way, core thicknesses of approximately 270 mm can be bridged by means of an additional anchor layer. Even larger core thicknesses can be bridged by means of several additional anchor layers.

The anchor layer and/or the pins may be made from fiber-reinforced composite material, in particular from CFRP or GFRP. In this manner, the pins can be cured together with the inner and outer cover layers, which are likewise made from fiber-reinforced composite material, and with the anchor layer.

According to an alternative embodiment, the support structure includes at least one profile support member, and may be a plurality of profile supports members, which, viewed in a cross section parallel to the central axis, extend transversely to the central axis, such as perpendicularly to the central axis, from a first section of the edge area to an opposite second section of the edge area. At least one profile support member has an outer belt section, which lies flat against the outer cover layer, an inner belt section, which lies flat against the inner cover layer, and a web section, which may extend parallel to the central axis, and which connects the belt sections and forms the layer. The profile support member can, for example, have a C profile, a double T profile, a Z profile or a similar profile. With such profile support members, it is possible to halt the development of or prevent the formation of cracks in the core layer and to halt or prevent delamination of the cover layers, without having to use pins for this purpose.

In this connection, the profile support member may be a first profile support member and if the support structure comprises a plurality of additional profile support members. The profile support members, i.e. the first and each additional profile support member, may extend parallel to one another viewed in an axial cross section perpendicular to the central axis. Additionally or alternatively, the profile support members can also extend transversely, in particular perpendicularly, to one another, so that they intersect one another. One first portion of the profile support members can extend parallel to one another and perpendicular to a second portion of the profile support members, so that a grid or checkered pattern with multiple rectangles is created. Alternatively, the profile support members can also extend in a cobweb shape, wherein a first portion of the profile support members extends in a radial direction relative to the central axis and/or a second portion of the profile support members extends in a tangential direction in concentric circles around the central axis. In this manner, the profile support members are uniformly distributed in the sandwich structure, so that the core layer and the cover layers can be effectively supported and stabilized.

A further aspect of the present invention relates to an aircraft having an aircraft fuselage, in which a pressure bulkhead according to one of the previously described embodiments is installed. The features and advantages described in relation to the pressure bulkhead apply analogously to the aircraft.

SUMMARY OF DRAWINGS

Various exemplary embodiments of the invention are explained in greater detail below with reference to the drawings. The drawings show in FIG. 1 is a view, taken in a cross section parallel to the central axis, of a first exemplary embodiment of the pressure bulkhead according to the invention having an anchor layer.

DETAILED DESCRIPTION OF INVENTION

Figure 1:
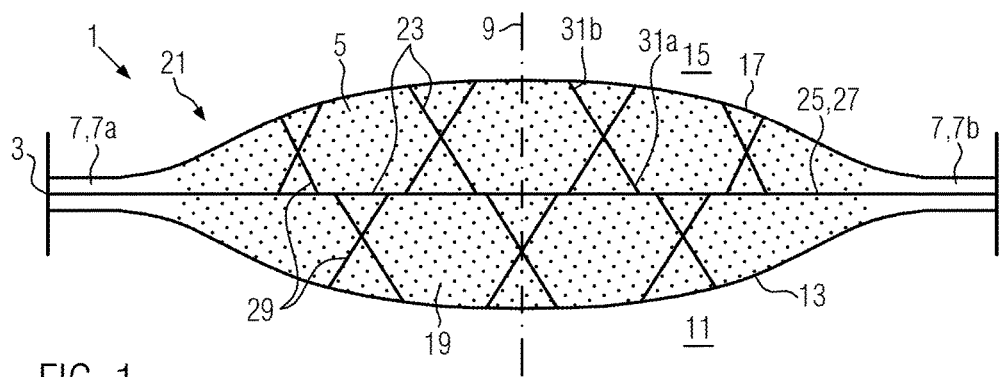

In FIG. 1 a first exemplary embodiment of the pressure bulkhead 1 according to the invention for an aircraft fuselage 3 is shown. The pressure bulkhead 1 is formed or constructed as a sandwich structure 5, which comprises a circumferential or circumferentially extending edge area 7 and which defines a central axis 9 between the edge area 7, i.e. between opposite sections 7a and 7b of the edge area 7. The edge area 7 is provided and adapted to be attached on the inner surface of the fuselage structure of an aircraft fuselage 3, as indicated in FIG. 1.

The sandwich structure 5 comprises an inner cover or top layer 13 facing towards the pressure side 11 of the aircraft fuselage 3, an outer cover or top layer 17 facing towards the rear side 15 of the aircraft fuselage 3, and a core layer 19 extending between the inner and the outer cover layers 13, 17, which core layer 19 connects the two cover layers 13, 17. The inner and the outer cover layers 13, 17 extend transversely to the central axis 9, with the central axis 9 being perpendicular with respect to the cover layers 13, 17. Viewed in a cross section 21 parallel to the central axis 9, from a first section 7a of the edge area 7 to an opposite second section 7b of the edge area 7, the outer cover layer 17 has a profile which is curved towards the rear side 15 and the inner cover layer 13 has a profile which is curved towards the pressure side 11, said profiles being convex and lenticular or lens-shaped and having a catenary form. The cover layers 13, 17 are made from fiber-reinforced composite material, in particular from CFRP or GFRP, and the core layer 19 is made from foam material, in particular from polymethacrylimide (PMI).

Between the inner and the outer cover layer 13, 17, in addition to the core layer 19, a support structure 23 is provided, which is connected to the cover layers 13, 17 and which extends from the inner cover layer 13 to the outer cover layer 17. The support structure 23 includes a layer 25 which, viewed in the cross section 21 parallel to the central axis 9, extends from the first section 7a of the edge area 7 to the opposite second section 7b of the edge area 7.

In the exemplary embodiment depicted in FIG. 1, the layer 25 is formed as an anchor or bracing layer 27, which extends centrally between the cover layers 13, 17 perpendicular to the central axis 9, which is formed from the same or a similar fiber-reinforced composite material as the cover layers 13, 17 and which, at the edge area 7, is formed in a monolithic manner together with the cover layers 13, 17. The support structure 23 further comprises a plurality of pins 29, which extend between the anchor layer 27 and the outer cover layer 17 and between the anchor layer 27 and the inner cover layer 13, and which are secured with a first end 31a in the anchor layer 27 and with an opposite second end 31b in one of the two cover layers 13, 17. The pins 29 are made from the same or a similar fiber-reinforced composite material as the cover layers 13, 17 and the anchor layer 27 and are cured together with them.

Figure 2:
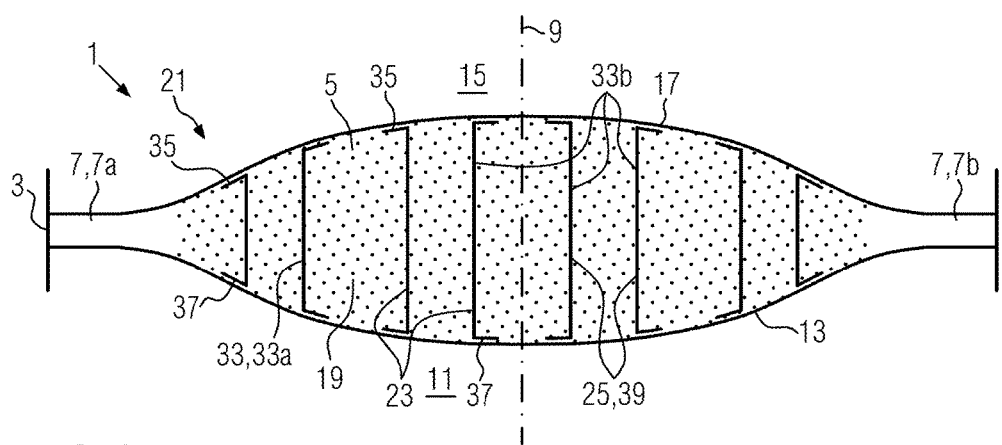
FIG. 2 is a view, taken in a cross section parallel to the central axis, of a first exemplary embodiment of the pressure bulkhead having several profile support members.

In FIG. 2 a second exemplary embodiment of a pressure bulkhead 1 according to the invention for an aircraft fuselage 3 is shown, wherein features corresponding to the first exemplary embodiment are identified with the same reference numerals. The pressure bulkhead 1 of FIG. 2 differs from the pressure bulkhead 1 of FIG. 1 in that, instead of an anchor layer 27, the support structure 23 comprises a plurality of profile support members 33, 33a, 33b, in particular, one profile support member 33 or a first profile support member 33a and a plurality of additional or further profile support members 33b. The profile support members 33, 33a, 33b extend, viewed in the cross section 21 parallel to the central axis 9, perpendicularly to the central axis 9 and from the first section 7a of the edge area 7 to the opposite second section 7b of the edge area 7. The profile support members 33, 33a, 33b comprise an outer belt section 35, which lies flat against the outer cover layer 17, an inner belt section 37, which lies flat against the inner cover layer 13, and a web or bar section 39, which connects the outer belt section 35 to the inner belt section 37. The web section 39 forms the layer 25. In the exemplary embodiment depicted in FIG. 2, the profile support members 33, 33a, 33b have a C profile, but they can, however, also have a different profile, such as a double T profile or a Z profile, for example.

Figure 3A:
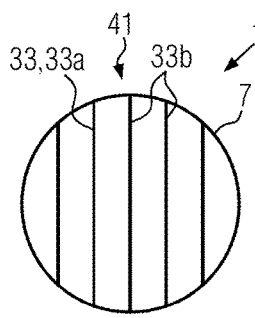
FIGS. 3a, 3b and 3c are views, taken in cross sections perpendicular to the central axis, of various embodiments of the pressure bulkhead having different arrangements of the profile support members.
Figure 3B:
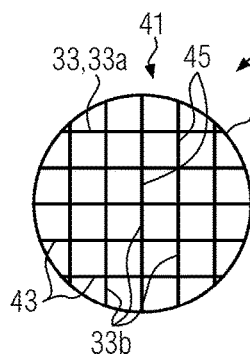
Figure 3C:
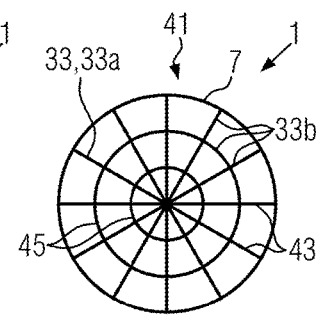

As schematically depicted in FIGS. 3a-3c, the profile support members 33, 33a, 33b can extend, viewed in an axial cross section 41 perpendicular to the central axis 9, parallel and spaced apart from one another (see FIG. 3a), intersecting one another, wherein a first portion 43 of the profile support members 33, 33a, 33b extends in the horizontal direction and a second portion 45 of the profile support members 33, 33a, 33b extends in the vertical direction (see FIG. 3b), or can extend in a cobweb shape, wherein a first portion 43 of the profile support members 33, 33a, 33b extends in a radial direction relative to the central axis 9 and a second portion 45 of the profile support members 33, 33a, 33b extends in a tangential direction in concentric circles around the central axis 9 (see FIG. 3c).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead for an aircraft fuselage comprising:
   a sandwich structure which defines a central axis and which extends between a circumferential edge area, which edge area is configured to be secured to a fuselage structure of an aircraft fuselage, wherein the sandwich structure includes:
      an inner cover layer which extends transversely to the central axis,
      an outer cover layer which extends opposite the inner cover layer and transversely to the central axis, and
      a core layer which extends between the inner and outer cover layers and connects them,
      wherein between the inner and the outer cover layer, in addition to the core layer, a support structure is provided, which is connected to the inner and outer cover layers and which extends from the inner cover layer to the outer cover layer, and
      the support structure comprises at least one layer which, viewed in a cross section parallel to the central axis, extends from a first section of the edge area to an opposite second section of the edge area.

2. The pressure bulkhead according to claim 1, wherein the outer cover layer has, viewed in a cross section parallel to the central axis, a convex, continuous and lenticular profile from the first section of the edge area towards the second section of the edge area.

3. The pressure bulkhead according to claim 1, wherein the inner cover layer has, viewed in a cross section parallel to the central axis, a convex, continuous and lenticular profile from the first section of the edge area towards the second section of the edge area.

4. The pressure bulkhead according to claim 1, wherein the inner cover layer has, viewed in a cross section parallel to the central axis, a straight profile from the first section of the edge area towards the second section of the edge area.

5. The pressure bulkhead according to claim 1, wherein the layer is configured as an anchor layer, which extends transversely to the central axis, wherein the support structure comprises a plurality of pins, which extend between the anchor layer and the outer cover layer and between the anchor layer and the inner cover layer, and which are secured with a first end in the anchor layer and with an opposite second end in the outer cover layer or the inner cover layer.

6. The pressure bulkhead according to claim 5, wherein the anchor layer is a first anchor layer, wherein one or more further anchor layers are provided, which extend transversely to the central axis, and
   wherein the pins extend between the different anchor layers as well as between one of the anchor layers and one of the cover layers.

7. The pressure bulkhead according to claim 5, wherein the anchor layer and/or the pins are formed from fiber-reinforced composite material.

8. The pressure bulkhead according to claim 1, wherein the support structure comprises at least one profile support member which, viewed in a cross section parallel to the central axis, extends transversely to the central axis from the first section of the edge area to the opposite second section of the edge area,
   wherein the profile support member comprises an outer belt section, which lies flat against the outer cover layer, an inner belt section, which lies flat against the inner cover layer, and a web section, which connects the belt sections and which forms the layer.

9. The pressure bulkhead according to claim 8, wherein the profile support member is a first profile support member,
   wherein the support structure comprises a plurality of further profile support members, and
   wherein the profile support members, viewed in an axial cross section perpendicular to the central axis, extend either parallel to one another and/or extend transverse to one another or extend radially and/or concentrically relative to the central axis.

10. An aircraft having an aircraft fuselage in which a pressure bulkhead according to claim 1 is installed.

11. A pressure bulkhead for an aircraft fuselage comprising:
    a sandwich structure including a central axis and a perimeter in a plane perpendicular to the central axis, wherein the sandwich structure includes a edge area adjacent to and continuous with the perimeter, wherein the edge area is configured to connect to the aircraft fuselage structure, wherein the sandwich structure includes:
       an inner cover layer covering a first side of the sandwich structure and extending to the edge area;
       an outer cover layer covering a second side, opposite to the first, of the sandwich structure, and extending to the edge area;
       a core layer between the inner and outer cover layers and joining the inner cover layer to the outer cover layer;
       a support structure between and joining the inner and outer cover layers, and
       an support structure layer included with the support structure, wherein the support structure layer extends from a first edge section of the edge area to a second edge section of the edge area, wherein the second edge section is opposite to the first edge section along a line extending through the central axis, and the support structure layer is joined to the first edge section and the second edge section.

12. The pressure bulkhead according to claim 11, wherein the outer cover layer is continuous and lenticular in a span between the first edge area and the second edge area.

13. The pressure bulkhead according to claim 11, wherein the inner cover layer is continuous and lenticular in a span between the first edge area and the second edge area.

14. The pressure bulkhead according to claim 11, wherein the inner cover layer is continuous and planar in a span between the first edge area and the second edge area.

15. The pressure bulkhead according to claim 11, wherein the support structure includes pins connected to the support structure layer and to the outer cover layer, whereby the pins secure the outer cover layer to the support structure layer.

16. The pressure bulkhead according to claim 15, wherein the support structure layer includes a first anchor layer and a second anchor layer both transverse to the central axis, and the pins extend between the first and the second anchor layers, and between at least one of the first and second anchor layers and at least one of the inner and outer cover layers.

17. The pressure bulkhead according to claim 15, wherein the first and second anchor layers and/or the pins are formed of a fiber-reinforced composite material.

18. The pressure bulkhead according to claim 11, wherein the support structure comprises at least one profile support member which extends between the first edge section and the second edge section,
   wherein the at least one profile support member comprises an outer belt section which lies flat against the outer cover layer, an inner belt section which lies flat against the inner cover layer, and a web section connecting the inner and outer belt sections.

19. The pressure bulkhead according to claim 18, wherein the profile support member is one of a plurality profile support members, and at least some of the profile support members are parallel to each other or extend radially towards the edge area.

* * * * *